(12) United States Patent  (10) Patent No.: US 6,740,852 B1
Wu et al.  (45) Date of Patent: May 25, 2004

(54) HEATING FACILITY HAVING MAGNETICALLY ATTACHED TEMPERATURE SENSING DEVICE

(76) Inventors: Tsan Kuen Wu, No. 88, Xing Long Road, Hu Li District, Xia Men, Fujian Province (CN); Hui Min Guo, No. 88, Xing Long Road, Hu Li District, Xia Men, Fujian Province (CN)

(*) Notice: Subject to any disclaimer, the term of this patent is extended or adjusted under 35 U.S.C. 154(b) by 0 days.

(21) Appl. No.: 10/356,983

(22) Filed: Feb. 3, 2003

(51) Int. Cl.⁷ .............................. H05B 1/02; H05B 3/06; G01K 1/02
(52) U.S. Cl. ...................... 219/436; 219/526; 219/536
(58) Field of Search ................................ 219/436, 433, 219/435, 520, 526, 536, 538, 541

(56) References Cited

U.S. PATENT DOCUMENTS 6,607,391 B2 * 8/2003 Mendelson et al. ......... 219/435

2003/0047554 A1 * 3/2003 Wang ......................... 219/433

FOREIGN PATENT DOCUMENTS

DE 3039991 * 5/1982
JP 02119083 * 5/1990

* cited by examiner

*Primary Examiner*—J. Pelham
(74) *Attorney, Agent, or Firm*—Charles E. Baxley

(57) ABSTRACT

An electrical heating facility includes an electrical heating element attached to a base and having two terminals, and a temperature sensing device having two conductors for electrically coupling to the terminals of the electrical heating element and to detect the temperature of the heating element. The temperature sensing device may be easily secured to the base with a magnetically secure device by the users, and may also be easily disengaged from the base when the temperature sensing device is hit or collided by people or objects inadvertently.

14 Claims, 4 Drawing Sheets

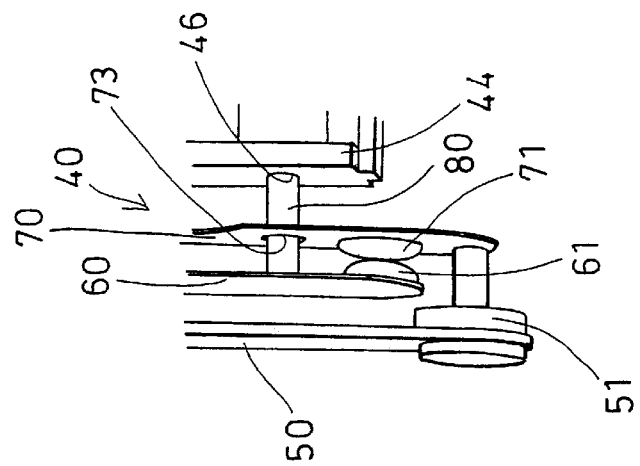
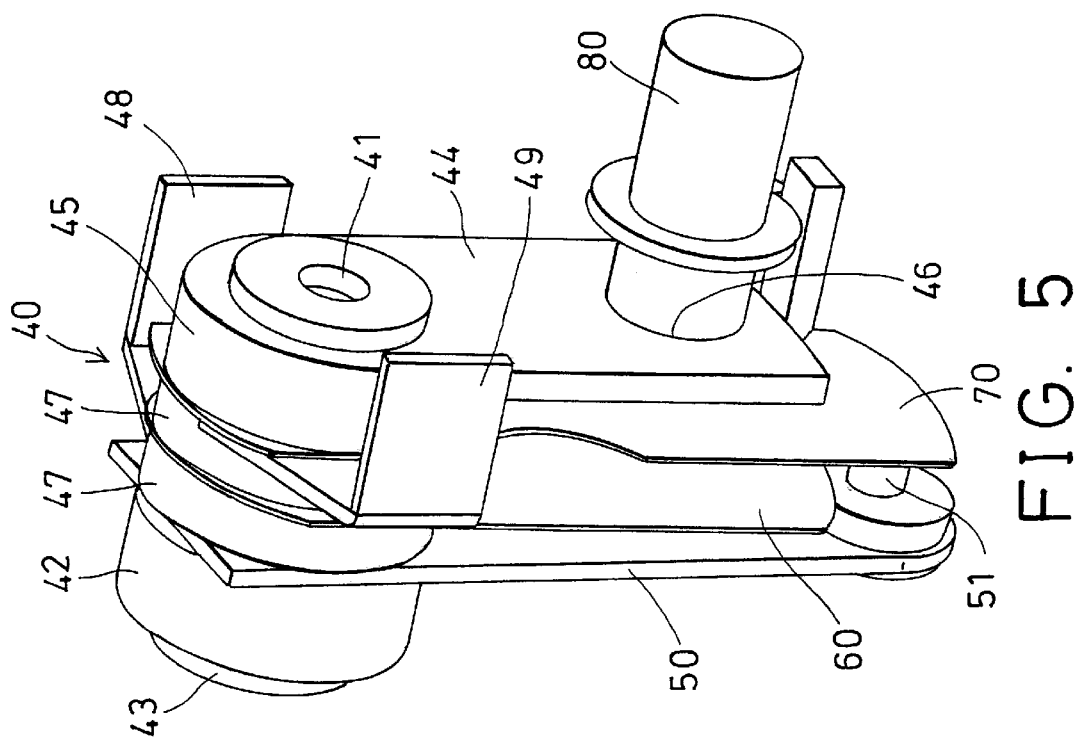

HEATING FACILITY HAVING MAGNETICALLY ATTACHED TEMPERATURE SENSING DEVICE

BACKGROUND OF THE INVENTION

1. Field of the Invention

The present invention relates to an electrical heating facility, and more particularly to an electrical heating or cooking facility having a magnetically attached temperature sensing device.

2. Description of the Prior Art

Various kinds of typical electrical facilities comprise various kinds of heating facilities for heating or cooking purposes, such as electric stoves, electric cookers, electric heaters, electric ovens, electric griddles, etc. For example, the electric stoves or ovens may be used to support containers in order to cook meals, soups, etc. The containers may fall off the stoves or oven, and the hot meals or soup may spill out of the containers, and may hurt people inadvertently.

For example, when the stoves or ovens or containers are hit or touched or bumped or collided by people, particular the children inadvertently, or the like, or the other outer forces have been applied onto the stoves or ovens or containers by people or by the other objects, the outwardly spilled hot meals or soup or water from the containers may seriously hurt or damage people, such as children.

Similarly, when earthquake happened, the hot meals or soup also may have a good chance to pill out of the containers, and may hurt people inadvertently. In addition, the heating elements may still be energized even when the containers have been disengaged from the stoves or ovens. Fires and the other disasters may thus be happened usually.

Some of the typical electrical facilities may comprise various kinds of temperature sensing devices to sense the temperatures of the electrical heating facilities, and to shut off the electric energy supplied to the electrical heating facilities when the temperatures of or around the electrical heating facilities have exceeded the predetermined or endurable temperature, or the like.

However, the electric energy supplied to the electrical heating facilities may not be shut off when the stoves or ovens or containers have been hit or touched or bumped or collided by people, particular the children inadvertently, or when the containers have been disengaged from the stoves or ovens.

In addition, the temperature sensing devices are typically built or secured within the electrical heating facilities solidly, and may not be easily removed from the typical electrical heating facilities, and may not be easily attached or secured onto the typical electrical heating facilities by the users themselves, such that the electrical heating facilities may not be replaced with the other new ones by the users themselves when the temperature sensing devices have been damaged or out of order.

The present invention has arisen to mitigate and/or obviate the afore-described disadvantages of the conventional electrical heating devices.

SUMMARY OF THE INVENTION

The primary objective of the present invention is to provide an electrical heating facility including a magnetically attached temperature sensing device which may be disengaged from the electric heating facility when the electrical heating facility is hit or touched or bumped or collided by people or by the other objects inadvertently, or when various outer forces have been applied onto the electrical heating facility.

The other objective of the present invention is to provide an electrical heating facility including a magnetically attached temperature sensing device which may be easily engaged or attached or secured onto the electric heating facility by the users themselves when required.

In accordance with one aspect of the invention, there is provided a n electrical heating facility comprising a base, an electrical heating element attached to the base, and including two terminals, a temperature sensing device including two conductors for electrically coupling to the terminals of the electrical heating element respectively, and means for magnetically securing the temperature sensing device to the base. The temperature sensing device may thus be easily secured or attached or assembled onto the base by the users themselves, and may also be easily disengaged from the base when the electrical heating facility or the temperature sensing device is hit or touched or bumped or collided by people or by the other objects inadvertently, or when various outer forces have been applied onto the electrical heating facility or to the temperature sensing device.

The magnetically securing means includes a first magnetically attractable element attached to the base, and a second magnetically attractable element attached to the temperature sensing device, to act with the first magnetically attractable element, and to magnetically attract the temperature sensing device to the base. The base includes a plate secured thereto.

The first magnetically attractable element is secured to the plate. The plate includes an orifice formed therein, the second magnetically attractable element of the temperature sensing device is engaged into the orifice of the plate.

The temperature sensing device includes a housing having at least one cavity formed therein, the plate includes at least one catch extended therefrom and engageable into the cavity of the housing, to stably secure the housing to the plate.

The base includes a bracket secured thereto and having a flap engaged with the first magnetically attractable element to stably secure the first magnetically attractable element to the base. The housing includes an opening formed therein, and includes a temperature sensing member received in the housing and coupled to the terminals of the electrical heating element.

The temperature sensing member includes a shaft, a first and a second blades secured on the shaft and coupled to the terminals of the electrical heating element respectively, the first and the second blades each includes a terminal contactable with each other, and separable from each other when the blades are distorted by heat.

The temperature sensing member includes a bar secured on the shaft and heat conductively coupled to the electrical heating element, and the bar includes an extension extended therefrom and contacted with the first blade to conduct heat from electrical heating element to the first blade.

A contact force adjusting device may further be provided for adjusting contacting force between the first and the second blades, and includes a rod slidably retained in the housing, and engageable with the second blade, to adjust the second blade away from and toward the first blade.

A barrel may further be provided and threaded to the housing and having a bore to slidably receive the rod therein, and to move the second blade away from and toward the first blade when the barrel is rotated relative to the housing. A knob may be secured to the barrel, and to rotate the barrel relative to the housing.

A board may further be provided and secured to the shaft and includes an aperture formed therein to slidably receive the rod.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 5 is a perspective view illustrating a temperature sensing device of the electrical heating facility; and FIG. 6 is a partial perspective view of the temperature sensing device, of the electrical heating facility, as seen from the opposite direction of that shown in FIG. 5.

DETAILED DESCRIPTION OF THE PREFERRED EMBODIMENT

Figure 1:
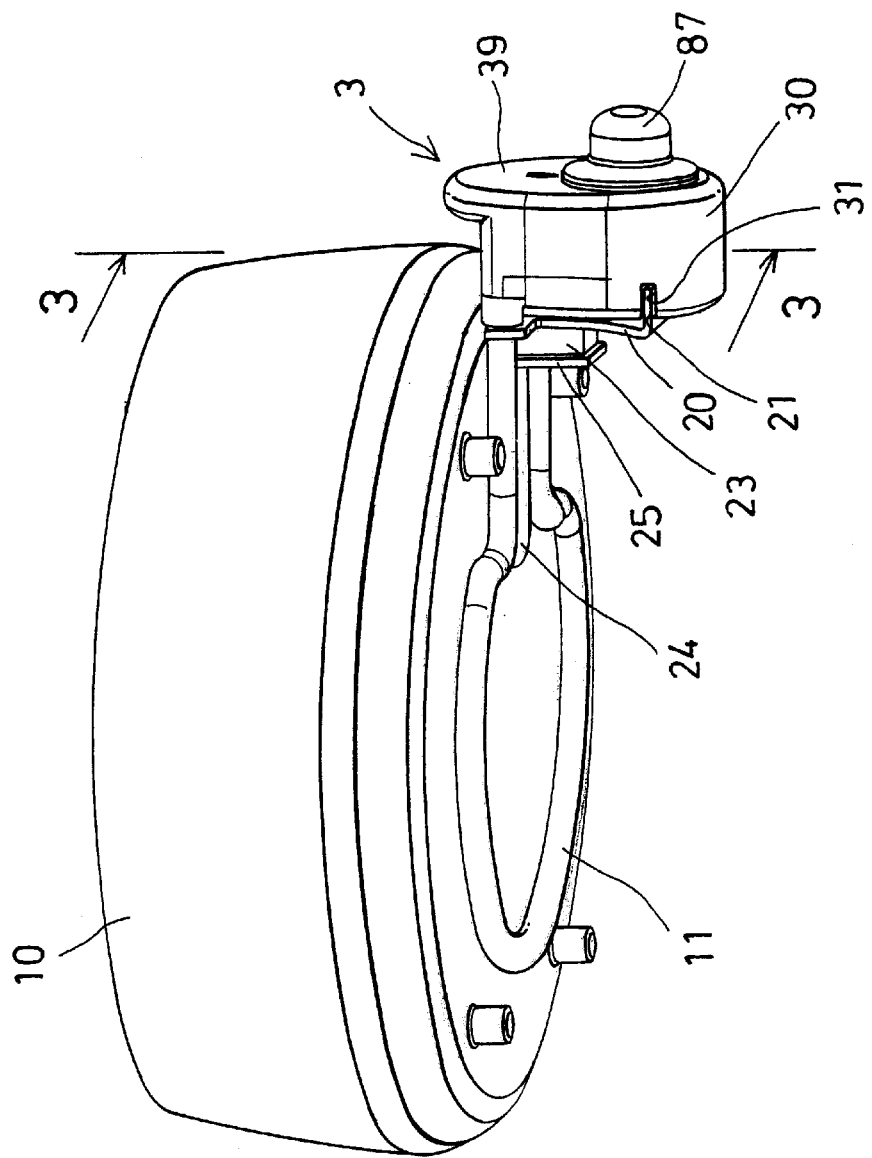
FIG. 1 is a bottom perspective view of an electrical heating facility in accordance with the present invention.

Referring to the drawings, and initially to FIGS. 1–4, an electrical heating facility in accordance with the present invention comprises a stove or oven body or a support or a base 10, and an electrical heating element 11 attached or secured to the base 10 for heating or cooking purposes. The electrical heating element 11 includes two ends or terminals 12 for coupling to and for being energized by electric power sources.

A plate 20 is secured to the electrical heating element 11, such as close to the terminal ends 12 of the electrical heating element 11, and includes one or more catches 21 laterally extended therefrom, such as extended forwardly or outwardly therefrom, and includes an orifice 22 formed therein. A magnetic or magnetized or magnetically attractable member 23 is secured to one side, such as the rear side of the plate 20, by such as fasteners, latches, adhesive materials, etc.

A bracket 24 may further be provided and secured to the base 10, and includes a flap 25 extended therefrom and engaged with the magnetic member 23, for further solidly retaining or securing the magnetic member 23 to the plate 20. The plate 20 may also be a magnetic or magnetized member for magnetically attracting purposes, and may be made of heat conductive materials, to receive and conduct the heat generated by the electrical heating element 11.

A temperature sensing device 3 is further provided and to be magnetically attached or secured to the base 10 with the magnetic member 23 or the plate 20, and includes a heat resistive or non-conductive housing 30 having one or more cavities 31 formed therein to receive the respective catches 21 of the plate 20, and for securing or retaining the housing 30 of the temperature sensing device 3 to the plate 20 and the base 10.

The housing 30 includes an opening 32 formed therein, and aligned with the orifice 22 of the plate 20, and includes two notches 38 formed therein to receive the ends or terminals 12 of the electrical heating element 11 and thus for allowing the ends or terminals 12 of the electrical heating element 11 to be engaged into the housing 30. A cover 39 may be secured to the housing 30 for enclosing the housing 30.

Two conductors 33 are secured in the housing 30 with such as pegs, fasteners, latches, hooks, adhesive materials, or by force-fitting engagements, or the like, and have one end 34 for electrically contacting with the terminals 12 of the electrical heating element 11 respectively, and each includes the other end 35 for electrically coupling to the other objects, such as for electrically coupling to two further conductors or conductive wires or cables 37 respectively.

Figure 2:
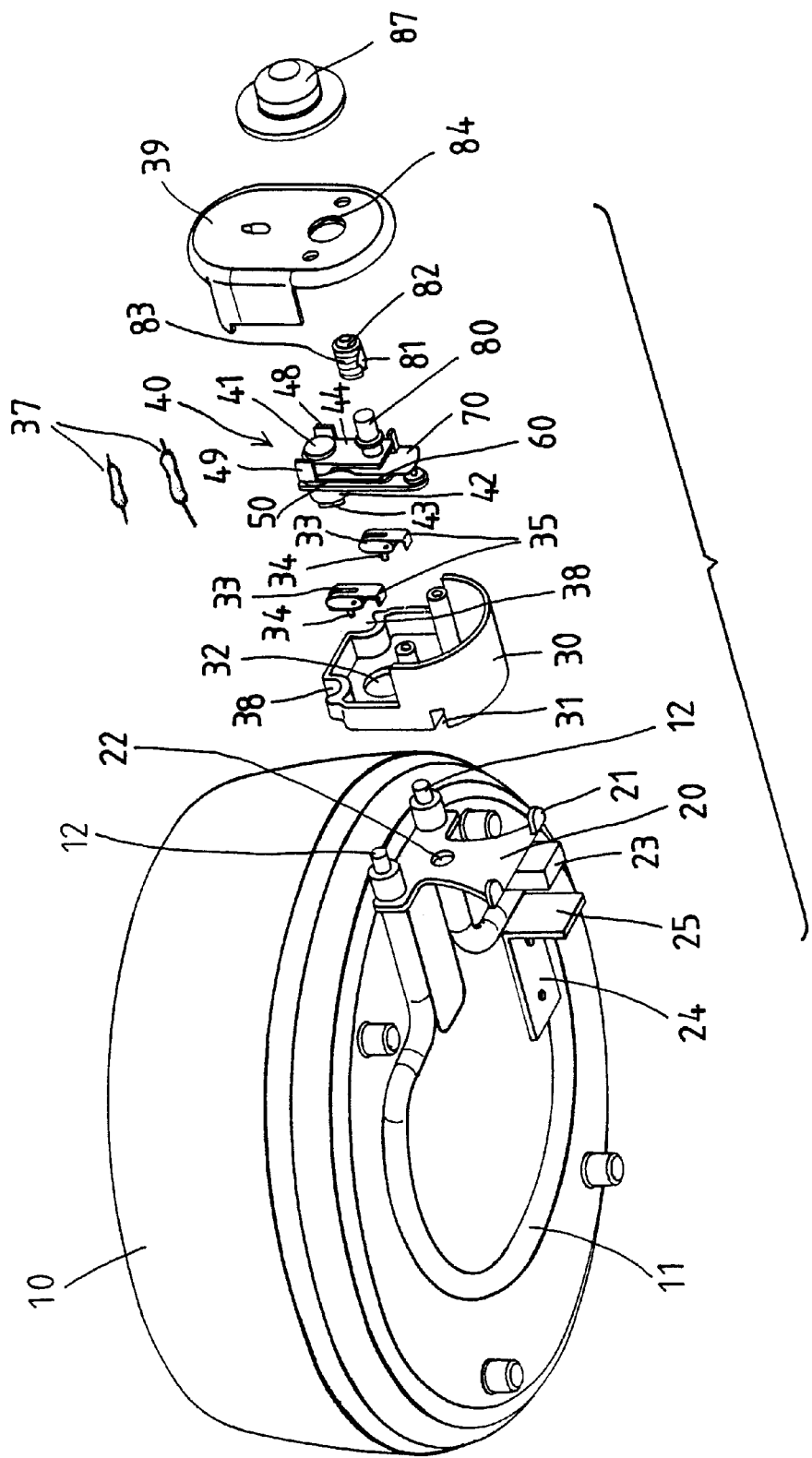
FIG. 2 is a partial exploded view of the electrical heating facility.
Figure 3:
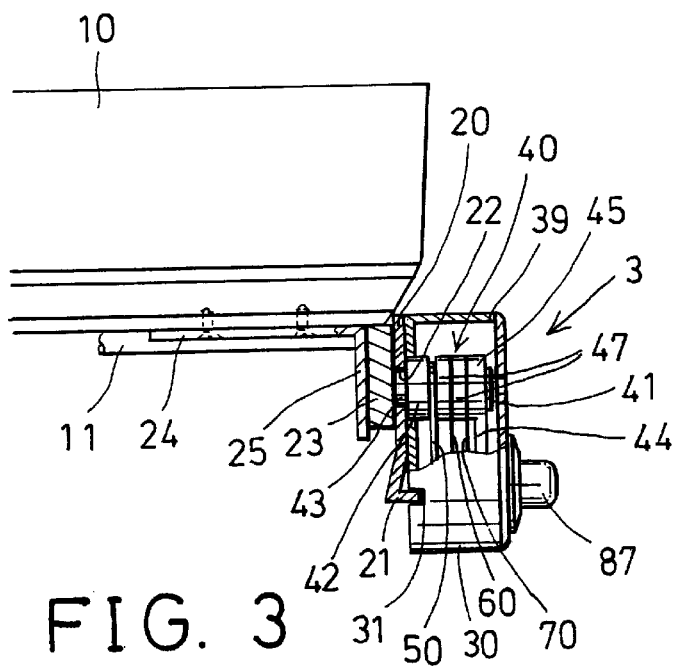
FIG. 3 is a partial plan schematic view of the electrical heating facility, in which a portion of the electrical heating facility has been cut off to show the inner structure of the electrical heating facility.
Figure 4:
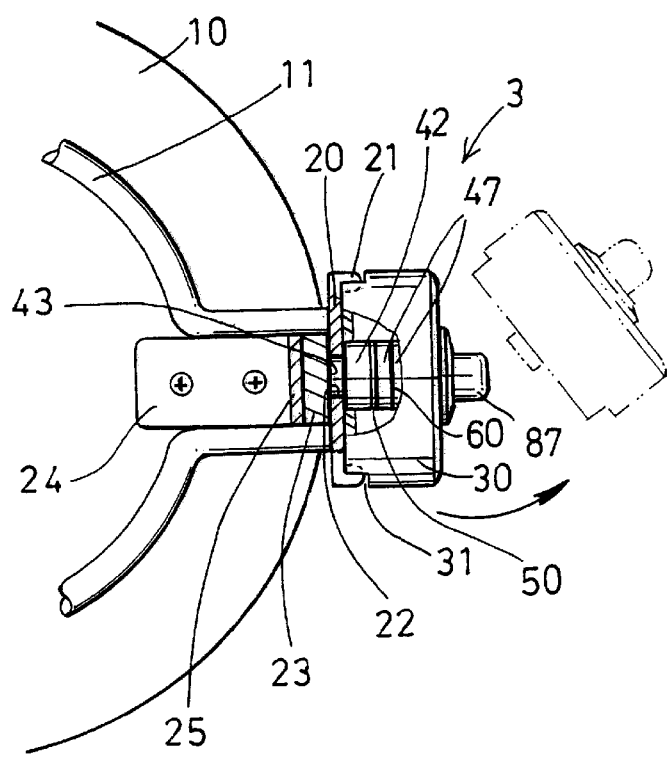
FIG. 4 is a partial bottom plan schematic view of the electrical heating facility, in which a portion of the electrical heating facility has been cut off to show the inner structure of the electrical heating facility.

As shown in FIGS. 2, 5, 6, a temperature sensing member 40 is received and secured in the housing 30 with such as fasteners, adhesive materials, or by force-fitting engagements, or the like, and includes a non-conductive shaft 41, and includes a block 42 secured to one end of the shaft 41 and received in the opening 32 of the housing 30 and contacted with the plate 20 (FIGS. 3, 4), and made of heat conductive materials, for conducting the heat from the plate 20.

A magnetic or magnetized or magnetically attractable element 43 is also secured to the one end of the shaft 41 with such as fasteners, adhesive materials, or by welding processes, or the like, and includes an outer diameter smaller than that of the block 42, for engaging into the orifice 22 of the plate 20 (FIGS. 3, 4), and for acting with the magnetic member 23, and thus for magnetically attracting or securing or attaching the temperature sensing member 40 and thus the temperature sensing device 3 to the plate 20 and the base 10.

The block 42 is made of heat conductive materials and may also be a magnetically attractable element for allowing the block 42 to be acted with the magnetic member 23, and thus for directly and magnetically attracting or securing or attaching the temperature sensing member 40 and thus the temperature sensing device 3 to the plate 20 and the base 10.

As shown in FIGS. 2, 3, 5, and 6, a board 44 has one end engaged onto the shaft 41, and is preferably made of non-conductive materials and/or heat resistive materials, and has an aperture 46 formed in the other end thereof. A bar 50 also includes one end engaged or secured onto the shaft 41, and is preferably made of heat conductive materials and engaged or contacted with the block 42, for receiving or conducting the heat from the plate 20 and the block 42.

Two blades 60, 70 each may also include one end engaged or secured onto the shaft 41, and is made of electric conductive materials or piezo-electric materials. Two spacers 47 are further provided and engaged onto the shaft 41, and engaged between the blades 60, 70, and between the blade 60 and the bar 50 respectively, and are made of non-conductive materials and/or heat resistive materials, for preventing the blades 60, 70 and the bar 50 from being electrically contacted with each other.

Two conductors 48, 49 are further provided and secured onto the shaft 41, and electrically contacted with the blades 60, 70 respectively, and contacted with the other ends 35 of the conductors 33 respectively and directly, or indirectly via the conductive wires or cables 37 respectively, for electrically coupling the blades 60, 70 to the terminals 12 of the electrical heating element 11 respectively. The conductive wires or cables 37 may also be used for electrically coupling the electrical heating element 11 to the electric power sources.

The blades 60, 70 each may include a contact point or terminal 61, 71 engaged with or contacted with each other, and the blades 60, 70 may be electrically and heat conductively coupled to the terminals 12 of the electrical heating element 11 via the conductors 33, 48, 49 respectively, for allowing the blades 60, 70 to receive or to conduct the heat from the terminals 12 of the electrical heating element 11 respectively.

The blades 60, 70 may be made of piezo-electric materials, and may be distorted for allowing the terminals 61, 71 of the blades 60, 70 to be separated or disengaged from each other when the blades 60, 70 are heated to predetermined temperatures, for example, and thus for shutting off the electrical coupling or connection between the terminals 61, 71 of the blades 60, 70 when the electrical heating element 11 or the blades 60, 70 are over-heated, for example.

The blade 70 may include a length greater than that of the other blade 60. The bar 50 may include an extension 51 secured thereto or extended therefrom and heat conductively contacted with the blade 70, for allowing the heat from the electrical heating element 11 and the plate 20 and the block 42 and the bar 50 to be transmitted to the blade 70, and for allowing the blades 60, 70 to be heated to different temperatures, and thus for allowing the terminals 61, 71 of the blades 60, 70 to be separated from each other when the blades 60, 70 are heated to different temperatures or are distorted to different curvatures.

An electrically insulated rod 80 has one end slidably engaged through the aperture 46 of the board 44 and engaged through an aperture 73 of the blade 70 and contacted with the blade 60 (FIG. 6), and includes the other end received in a bore 81 of a barrel 82. The barrel 82 includes an outer thread 83 formed thereon and threaded with a screw hole 84 of the housing 30, or of the cover 39 of the housing 30, for allowing the rod 80 to be moved toward or away from the blade 60 by rotating or threading the barrel 82 relative to the cover 39 or the housing 30.

A knob 87 may further be provided and secured to the barrel 82 for rotating and threading the barrel 82 relative to the cover 39 or the housing 30, and thus for moving the rod 80 toward or against or away from the blade 60, in order to adjust the contacting force or compressing force between the terminals 61, 71 of the blades 60, 70, and so as to adjust the temperatures of the blades 60, 70 when the terminals 61, 71 of the blades 60, 70 will be separated from each other, and such that the temperatures when the electrical coupling or connection between the blades 60, 70 or between the terminals 12 of the electrical heating element 11 may be adjusted by adjusting the rod 80 relative to the housing 30 or the board 44 or the blade 60.

In operation, the magnetic member 23 may act with either the magnetically attractable element 43 and/or the magnetically attractable block 42, for allowing the temperature sensing device 3 to be magnetically attracted or secured to the plate 20 or the base 10. The catches 21 of the plate 20 may further be easily engaged into the cavities 31 of the housing 30 respectively, in order to further solidly secure or attach the housing 30 of the temperature sensing device 3 to the plate 20 or the base 10.

The housing 30 of the temperature sensing device 3 may be easily disengaged from the plate 20 and the base 10 when the housing 30 or the temperature sensing device 3 is hit or touched or bumped or collided by people or by the other objects inadvertently, or when various outer forces have been applied onto the housing 30 or the temperature sensing device 3. Once the housing 30 or the temperature sensing device 3 is disengaged from the plate 20 and the base 10, the electric power supply to the electrical heating element 11 may be shut off or terminated.

The temperature sensing member 40 that is received in the housing 30 and that is coupled to the terminals 12 of the electrical heating element 11 may be used to shut off or terminate the electrical coupling or connection between the terminals 61, 71 of the blades 60, 70 when the electrical heating element 11 is over-heated, or when the blades 60, 70 are heated to different temperatures, or when a great temperature difference is formed between the blades 60, 70.

It is to be noted that the shaft 41 and the spacers 47 may prevent the bar 50 and the blades 60, 70 from being electrically contacted with each other. The bar 50 and the extension 51 of the bar and the block 42 and the plate 20 may transmit heat from the electrical heating element 11 to the blade 70.

Accordingly, the electrical heating facility in accordance with the present invention includes a magnetically attached temperature sensing device which may be disengaged from the electric heating facility when the electrical heating facility is hit or touched or bumped or collided by people or by the other objects inadvertently, or when various outer forces have been applied onto the electrical heating facility. The magnetically attached temperature sensing device may also be easily engaged or attached or secured or assembled onto the electric heating facility by the users themselves when required.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An electrical heating facility comprising:
   a base,
   an electrical heating element attached to said base, and including two terminals,
   a temperature sensing device including two conductors for electrically coupling to said terminals of said electrical heating element respectively, and
   means for magnetically securing said temperature sensing device to said base.

2. The electrical heating facility as claimed in claim 1, wherein said magnetically securing means includes a first magnetically attractable element attached to said base, and a second magnetically attractable element attached to said temperature sensing device, to act with said first magnetically attractable element, and to magnetically attract said temperature sensing device to said base.

3. The electrical heating facility as claimed in claim 2, wherein said base includes a plate secured thereto, said first magnetically attractable element is secured to said plate.

4. The electrical heating facility as claimed in claim 3, wherein said plate includes an orifice formed therein, said second magnetically attractable element of said temperature sensing device is engaged into said orifice of said plate.

5. The electrical heating facility as claimed in claim 3, wherein said temperature sensing device includes a housing having at least one cavity formed therein, said plate includes at least one catch extended therefrom and engageable into said at least one cavity of said housing, to stably secure said housing to said plate.

6. The electrical heating facility as claimed in claim 2, wherein said base includes a bracket secured thereto and having a flap engaged with said first magnetically attractable element to stably secure said first magnetically attractable element to said base.

7. The electrical heating facility as claimed in claim 2, wherein said temperature sensing device includes a housing having an opening formed therein, and includes a temperature sensing member received in said housing and coupled to said terminals of said electrical heating element.

8. The electrical heating facility as claimed in claim 7, wherein said temperature sensing member includes a shaft, a first and a second blades secured on said shaft and coupled to said terminals of said electrical heating element respectively, said first and said second blades each includes a terminal contactable with each other, and separable from each other when said blades are distorted by heat.

9. The electrical heating facility as claimed in claim 8, wherein said temperature sensing member includes a bar secured on said shaft and heat conductively coupled to said electrical heating element, and said bar includes an extension extended therefrom and contacted with said first blade to conduct heat from electrical heating element to said first blade.

10. The electrical heating facility as claimed in claim 8 further comprising means for adjusting contacting force between said first and said second blades.

11. The electrical heating facility as claimed in claim 10, wherein said contacting force adjusting means includes a rod slidably retained in said housing, and engageable with said second blade, to adjust said second blade away from and toward said first blade.

12. The electrical heating facility as claimed in claim 11, wherein said contacting force adjusting means includes a barrel threaded to said housing and having a bore to slidably receive said rod therein, and to move said second blade away from and toward said first blade when said barrel is rotated relative to said housing.

13. The electrical heating facility as claimed in claim 12, wherein said contacting force adjusting means includes a knob secured to said barrel, and to rotate said barrel relative to said housing.

14. The electrical heating facility as claimed in claim 12 further comprising a board secured to said shaft and including an aperture formed therein to slidably receive said rod.

\* \* \* \* \*